Patented Nov. 7, 1944

2,361,967

UNITED STATES PATENT OFFICE 2,361,967

PROCESS FOR PREPARING LACTONES OF THE SATURATED AND UNSATURATED, CYCLOPENTANOPOLYHYDROPHENAN-THRENE SERIES

Leopold Ruzicka, Zurich, Switzerland, assignor to Ciba Pharmaceutical Products, Incorporated, Summit, N. J., a corporation of New Jersey No Drawing. Application April 29, 1942, Serial No. 441,033. In Switzerland May 31, 1941

11 Claims. (Cl. 260—239.5)

The present invention relates to the manufacture of lactones of the saturated and unsaturated cyclopentanopolyhydrophenanthrene series by condensing a compound of the said series having the general formula

R—CO—CR=X wherein one of the two R's stands for a radical containing the cyclopentanopolyhydrophenanthrene ring structure, the other R is a member of the group consisting of hydrogen or a hydrocarbon radical, such as alkyl, or a carbalkoxy group, and X stands for an oxo group, a thio group or a bivalent radical or two monovalent radicals, these radicals being a functionally moderated oxo or thio group, with a functional derivative of a halogen fatty acid, such as an a- or β-halogenated fatty acid ester, amide or nitrile, subjecting the condensation product if necessary to the action of reducing agents and, if desired, to the action of hydrolyzing and lactonizing agents or to a re-esterifying treatment and/or a treatment for splitting off water.

The parent materials are therefore keto-aldehydes and diketones of the cyclopentanopolyhydrophenanthrene series or of their functional derivatives and corresponding thio-compounds, for example acetals or mercaptals.

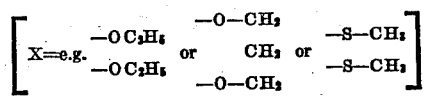

derivatives of carboxylic acids

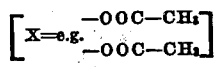

or of amines and other nitrogen compounds

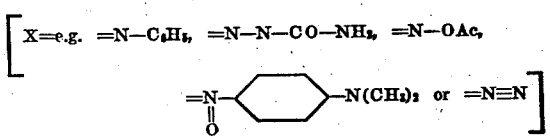

For example, there may generally be used saturated and unsaturated 20:21-dioxo-pregnanes and derivatives thereof, such as Δ⁵-3-hydroxy-pregnene-20-one-21-al or Δ⁴-pregnene-3:20-di-one-21-al or their acetals or mercaptals, further-more 21-diazo-21-carbethoxy-pregnane-20-ones, diazoprogesterone as well as corresponding stereoisomers and homologues.

The condensation may be effected in known manner by means of metals, such as zinc or magnesium, in a suitable inert solvent, for instance benzene, toluene, dioxane or ether.

If, for example, free keto-aldehydes are used as starting materials, there are formed mixtures of isomers, since the reaction with the halogenated fatty acid derivatives occurs at the keto group, on the one hand, and at the aldehyde group, on the other. It is therefore advantageous to start from the indicated aldehyde derivatives.

When using an acetal

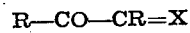

as starting material for the new process, the condensation products are appropriately treated first with hydrolyzing agents, especially acid agents, whereupon the aldehyde group which is now free is reduced to a hydroxyl group. The reducing treatment may consist for example of a catalytic hydrogenation, but there may be used also other reducing methods which are suitable for converting an oxo-group into a carbinol group. Subsequently a treatment with lactonizing agents, e. g. with acid agents, is carried out.

When lactonization takes place only with difficulty a treatment with re-esterifying or hydrolyzing and then lactonizing agents may be advantageous. As a partial elimination of water occurs frequently during the lactonisation, one obtains in many instances mixtures which may be separated into their constituents or further worked up as mixtures. Thus if desired the products obtained may be subjected to the known treatments for eliminating water, of which distillation or sublimation under diminished pressure has proved especially useful, if desired after admixture with surface-active substances, for instance aluminium oxide, silica gel, active carbon, fuller's earth or with an anhydrous salt, for instance copper sulfate. The mixture produced of lactones may be treated for isolating pure components in the usual manner, for instance by fractional crystallization or by chromatographic adsorption analysis.

The products obtained by this process are 5- or 6-membered saturated hydroxylactones or unsaturated lactones of the cyclopentanopolyhydrophenanthrene series. They may possess between the lactone ring and the cyclopentanopolyhydrophenanthrene nucleus an aliphatic radical, for instance an alkylene group.

The following examples illustrate the invention, but are not regarded as limiting it in any way:

Example 1

2.0 grams of Δ$^5$-pregnane-3-ole-20-one-21-dimethyl-acetal of melting point 113° C. and of the formula

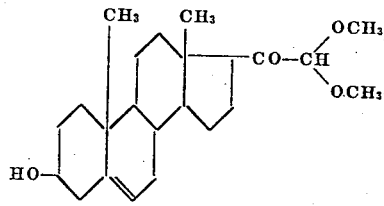

are caused to react in absolute benzene with 5.0 grams of ethylbromoacetate and 1 gram of zinc spangles. When the first energetic reaction has ceased, the mixture is boiled for 1 hour in a reflux apparatus and then mixed with absolute alcohol. After filtering the zinc mud which has not undergone reaction, there are added 10 cc. of concentrated hydrochloric acid and 100 cc. of water and the reaction mixture is shaken for 12 hours by a mechanical shaker. The precipitated product is suction-filtered, washed with water and shaken with hydrogen in the presence of Raney nickel until 1 mol. of hydrogen has been absorbed. The crude product of the hydrogenation is boiled for 6 hours with 10 cc. of acetic anhydride and recrystallized from alcohol after evaporating the acetic acid anhydride in excess. As main product there is obtained the Δ$^{5:6;20:22}$-3-acetoxy-21-hydroxy-norcholadienic acid lactone of melting point 174° C. and of the formula

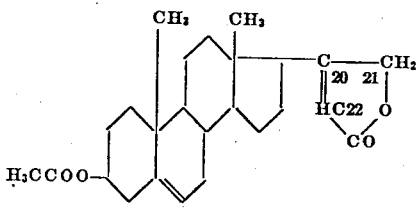

Instead of the named dimethylacetal there may also be used the corresponding diethylmercaptal of melting point 125–125° C. or also the free aldehyde.

When starting from a mixture of isonitroso compounds obtained by the action of amylnitrite on norcholestene-3-ole-25-one in the presence of sodium ethylate, there is obtained in analogous manner Δ$^{5:6;25:26}$-3-acetoxy-24-hydroxy-26-methyl-cholestadiene-26-carboxylic acid lactone and Δ$^{5:6;25:26}$-3-acetoxy-27-hydroxy-26-methyl-cholestadiene-26-carboxylic acid lactone.

The compounds named in the preceding paragraph correspond to the following formulae:

Norcholestene-3-ole-25-one—

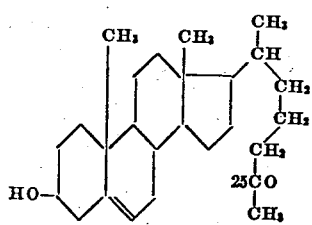

Δ$^{5:6;25:26}$-3-acetoxy-24-hydroxy-26-methyl-cholestadiene-26-carboxylic acid lactone—

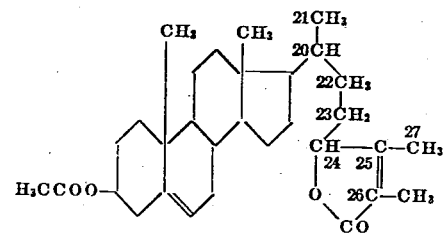

Δ$^{5:6;25:26}$-3-acetoxy-27-hydroxy-26-methyl-cholestadiene-26-carboxylic acid lactone—

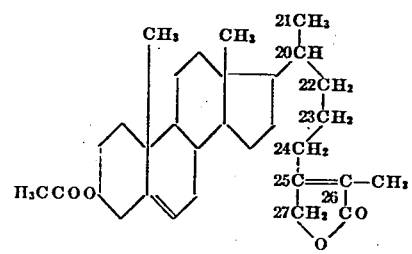

Example 2

5 grams of Δ$^5$-3-acetoxy-24-keto-25-diazo-25-homocholene of melting point 155° C. are dissolved in benzene and the solution is caused to react with 10 grams of ethylbromoacetate after addition of 5 grams of activated zinc spangles. The reaction product is taken up in absolute alcohol and filtered in order to remove the zinc which has not been used. Dilute hydrochloric acid is added to the alcohol solution and the whole is allowed to stand in the cold until the evolution of gas is finished. It is boiled for a short time and the alcohol is concentrated considerably. The reaction product is taken up in ether and water, thoroughly washed with hydrochloric acid and water and finally concentrated in ether. The crude product is treated in the heat for several hours with acetic anhydride, whereupon it is again evaporated to dryness. The crystallized residue is chromatographed, whereby the β-[Δ$^5$-3-hydroxy-norcholenyl-(23)]-Δ$^{α:β}$-butenolide of melting point 229–230° C. is obtained and having the formula

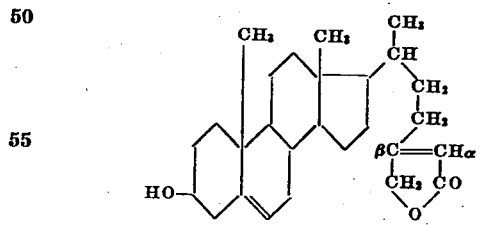

In similar manner there is obtained 14-desoxy-digitoxigenine (melting point 225–227° C.) from 3-acetoxy-21-diazo-pregnane-20-one of melting point 140–142° C., and Δ$^{5:6;20:22}$-3:21-dihydroxy-norcholadienic acid lactone (melting point 262° C.) from Δ$^5$-3-acetoxy-21-diazo-pregnene-20-one of melting point 148–150° C.

When starting from Δ$^5$-3-acetoxy-24-keto-25-diazo-27-nor-cholestene (obtained by reacting Δ$^5$-3-acetoxy-cholenic acid chloride with diazoethane) and causing this product to react with α-bromopropionic ester or α-bromopropionic nitrile, there is obtained in analogous manner β-[Δ$^5$-3-hydroxy-norcholenyl-(23)]-α:β-dimethyl-Δ$^{α:β}$-butenolide.

What I claim is:

1. In a process for the manufacture of a compound of the saturated and unsaturated cyclopentanopolyhydrophenanthrene series, the step of reacting a compound of the formula

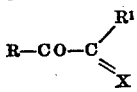

wherein R represents a radical containing the cyclopentanopolyhydrophenanthrene ring structure, $R^1$ represents a member of the group consisting of hydrogen, a hydrocarbon radical and a carbalkoxy group, and X represents a member of the group consisting of oxo, thio, isonitroso, acetal, mercaptal and diazo groups, with a member of the group consisting of α- and β-halogenated fatty acid esters, amides and nitriles, in the presence of a metal condensing agent, whereby the residue of the said member of the group consisting of α- and β-halogenated fatty acid esters, amides and nitriles which remains upon subtracting the α- or β-halogen atom is directly attached to the C atom of the

group.

2. In a process for the manufacture of a compound of the saturated and unsaturated cyclopentanopolyhydrophenanthrene series, the step of reacting a compound of the formula

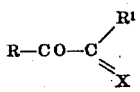

wherein R represents a radical containing the cyclopentanopolyhydrophenanthrene ring structure, $R^1$ represents a member of the group consisting of hydrogen, a hydrocarbon radical and a carbalkoxy group, and X represents a member of the group consisting of oxo, thio, isonitroso, acetal, mercaptal and diazo groups, with an ester of an α-halogen fatty acid in the presence of a metal condensing agent, whereby the residue of the said member of the group consisting of α- and β-halogenated fatty acid esters, amides and nitriles which remains upon subtracting the α- or β-halogen atom is directly attached to the C atom of the

group.

3. In a process for the manufacture of a compound of the saturated and unsaturated cyclopentanopolyhydrophenanthrene series, the step of reacting a compound of the formula

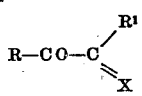

wherein R represents a radical containing the cyclopentanopolyhydrophenanthrene ring structure, $R^1$ represents a member of the group consisting of hydrogen, a hydrocarbon radical and a carbalkoxy group, and X represents a member of the group consisting of oxo, thio, isonitroso, acetal, mercaptal and diazo groups, with ethyl bromacetate in the presence of a metal condensing agent, whereby the residue of the said member of the group consisting of α- and β-halogenated fatty acid esters, amides and nitriles which remains upon subtracting the α- or β-halogen atom is directly attached to the C atom of the

group.

4. A process for the manufacture of a compound of the saturated and unsaturated cyclopentanopolyhydrophenanthrene series, which comprises reacting a compound of the formula

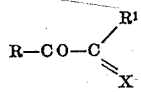

wherein R represents a radical containing the cyclopentanopolyhydrophenanthrene ring structure, $R^1$ represents a member of the group consisting of hydrogen, a hydrocarbon radical and a carbalkoxy group, and X represents a member of the group consisting of oxo, thio, isonitroso, acetal, mercaptal and diazo groups, with a member of the group consisting of α- and β-halogenated fatty acid esters, amides and nitriles, in the presence of a metal condensing agent, whereby the residue of the said member of the group consisting of α- and β-halogenated fatty acid esters, amides and nitriles which remains upon subtracting the α- or β-halogen atom is directly attached to the C atom of the

group, and then subjecting the resultant condensation product to the action of a lactonizing agent.

5. A process for the manufacture of a compound of the saturated and unsaturated cyclopentanopolyhydrophenanthrene series, which comprises reacting a compound of the formula

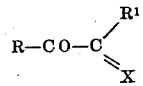

wherein R represents a radical containing the cyclopentanopolyhydrophenanthrene ring structure, $R^1$ represents a member of the group consisting of hydrogen, a hydrocarbon radical and a carbalkoxy group, and X represents a member of the group consisting of oxo, thio, isonitroso, acetal, mercaptal and diazo groups, with a member of the group consisting of α- and β-halogenated fatty acid esters, amides and nitriles, in the presence of a metal condensing agent, whereby the residue of the said member of the group consisting of α- and β-halogenated fatty acid esters, amides and nitriles which remains upon subtracting the α- or β-halogen atom is directly attached to the C atom of the

group, and then subjecting the resultant condensation product to the action of a hydrolyzing agent and a lactonizing agent.

6. A process for the manufacture of a compound of the saturated and unsaturated cyclopentanopolyhydrophenanthrene series, which comprises reacting a compound of the formula

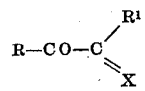

wherein R represents a radical containing the cyclopentanopolyhydrophenanthrene ring structure, $R^1$ represents a member of the group consisting of hydrogen, a hydrocarbon radical and a carbalkoxy group, and X represents a member of the group consisting of oxo, thio, isonitroso, acetal, mercaptal and diazo groups, with a member of the group consisting of α- and β-halogenated fatty acid esters, amides and nitriles, in the presence of a metal condensing agent, whereby the residue of the said member of the group consisting of α- and β-halogenated fatty acid esters, amides and nitriles which remains upon subtracting the α- or β-halogen atom is directly attached to the C atom of the

group, and then subjecting the resultant condensation product to the action of a hydrolyzing agent, a lactonizing agent and a re-esterifying agent.

7. A process for the manufacture of a compound of the saturated and unsaturated cyclopentanopolyhydrophenanthrene series, which comprises reacting a compound of the formula

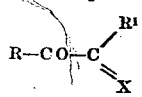

wherein R represents a radical containing the cyclopentanopolyhydrophenanthrene ring structure, $R^1$ represents a member of the group consisting of hydrogen, a hydrocarbon radical and a carbalkoxy group, and X represents a member of the group consisting of oxo, thio, isonitroso, acetal, mercaptal and diazo groups, with a member of the group consisting of α- and β-halogenated fatty acid esters, amides and nitriles, in the presence of a metal condensing agent, whereby the residue of the said member of the group consisting of α- and β-halogenated fatty acid esters, amides and nitriles which remains upon subtracting the α- or β-halogen atom is directly attached to the C atom of the

group, and subjecting the resultant condensation product to the action of lactonizing means and then to a process for eliminating water.

8. A process according to claim 4, wherein the said condensation product is also subjected to the action of a reducing agent.

9. A process according to claim 5, wherein the said condensation product is also subjected to the action of a reducing agent.

10. A process according to claim 6, wherein the said condensation product is also subjected to the action of a reducing agent.

11. A process according claim 7, wherein the said condensation product is also subjected to the action of a reducing agent.

LEOPOLD RUZICKA.